Jan. 23, 1923. 1,443,035
A. E. OLSON.
ROTARY VALVE FOR INTERNAL COMBUSTION ENGINES.
FILED JULY 5, 1921. 3 SHEETS-SHEET 2
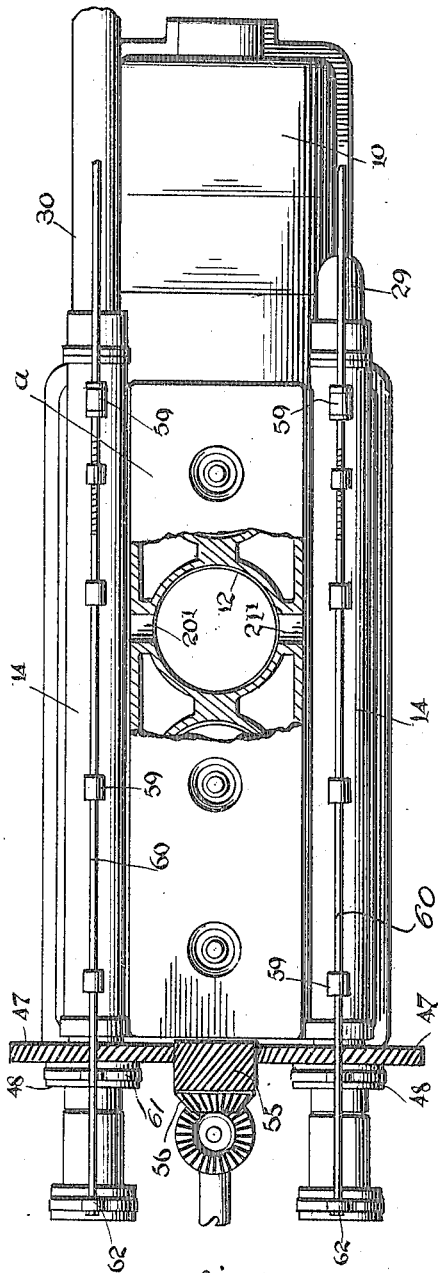
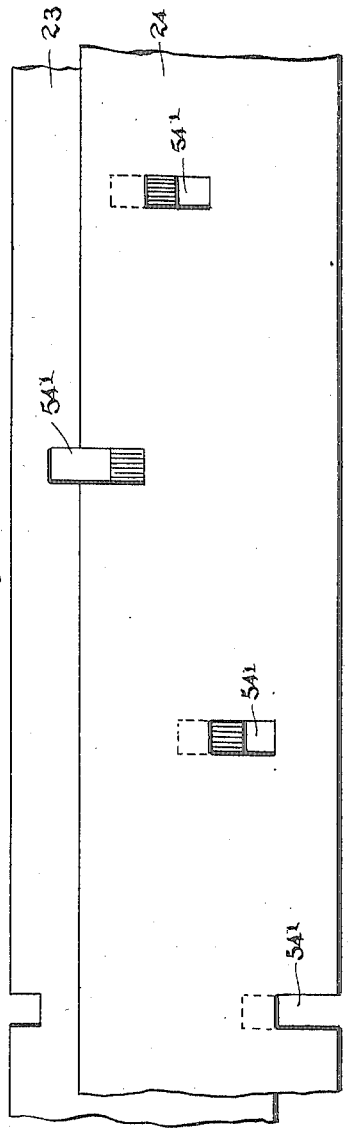
WITNESSES
INVENTOR
A.E. Olson,
BY
ATTORNEYS

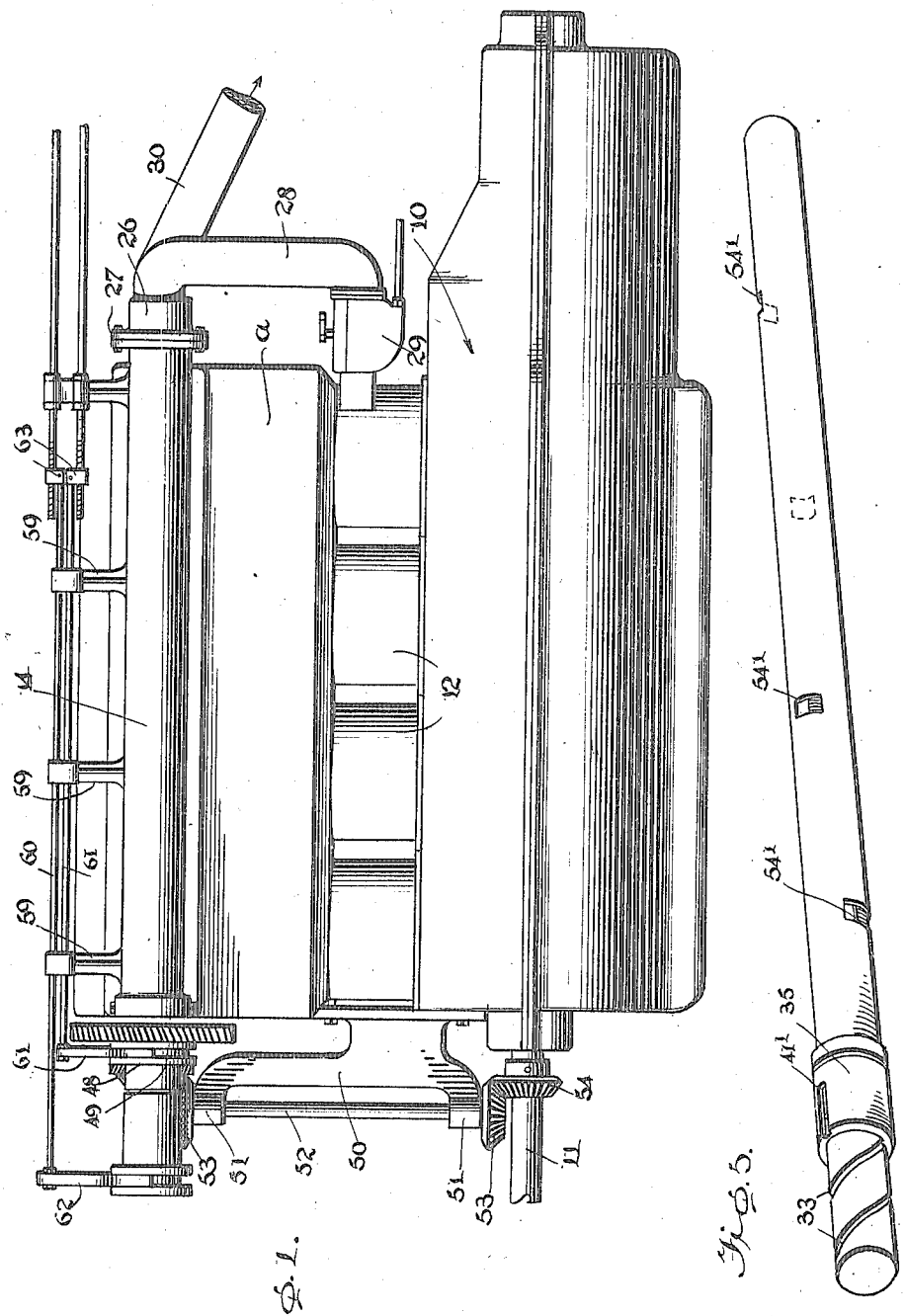

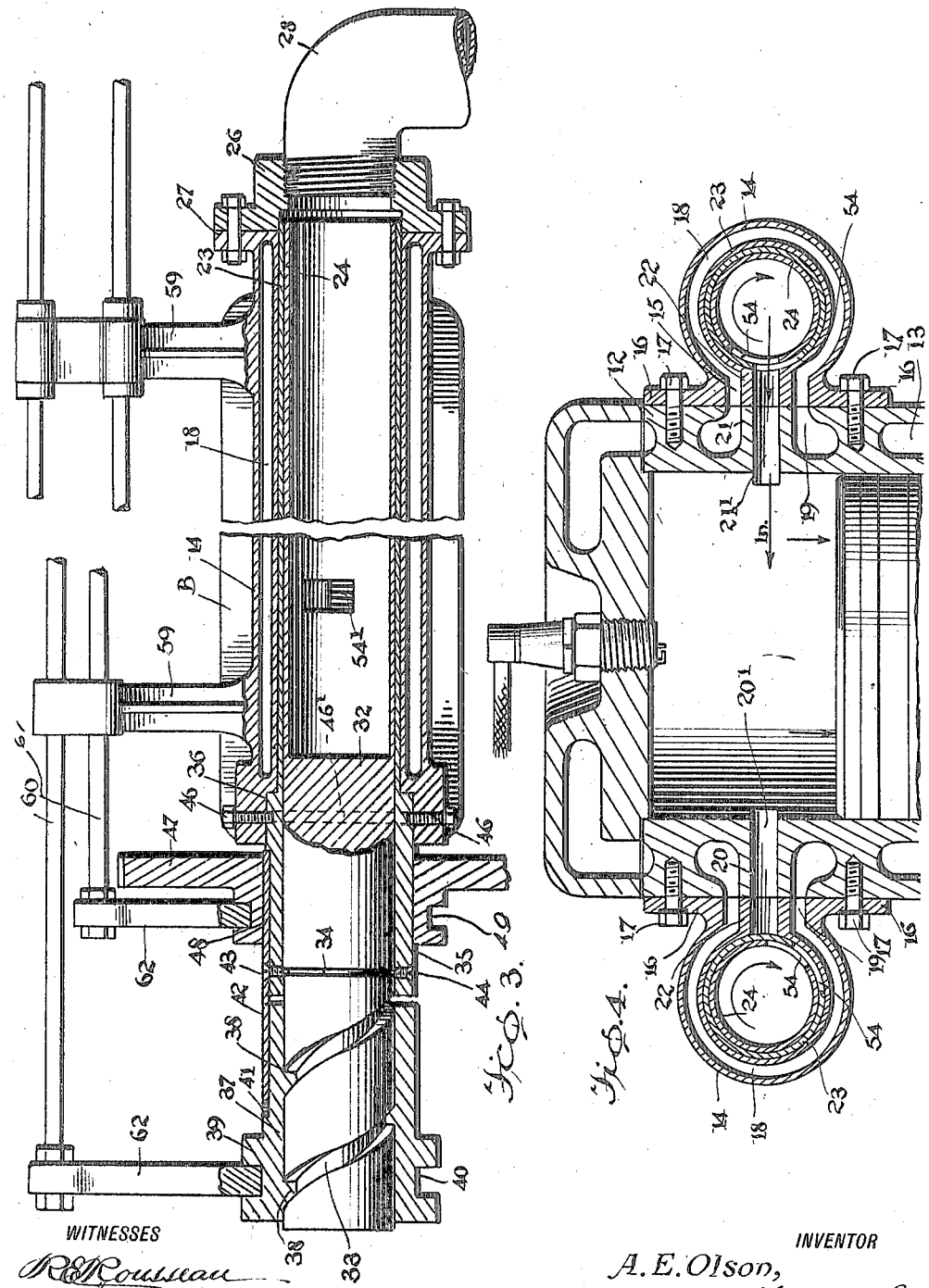

Patented Jan. 23, 1923.

1,443,035

UNITED STATES PATENT OFFICE.

AXEL E. OLSON, OF BROWERVILLE, MINNESOTA.

ROTARY VALVE FOR INTERNAL-COMBUSTION ENGINES.

Application filed July 5, 1921. Serial No. 482,414.

*To all whom it may concern:*

Be it known that I, AXEL E. OLSON, a citizen of the United States, and a resident of Browerville, in the county of Todd and State of Minnesota, have invented certain new and useful Improvements in Rotary Valves for Internal-Combustion Engines, of which the following is a specification.

This invention relates to rotary valves for internal combustion engines.

The object of the invention is to provide a rotary valve construction and controlling mechanism therefor, whereby the period of exhaust and intake of an internal combustion engine may be accurately controlled.

It is also an object of the invention to provide a construction of the above character, whereby the time at which the exhaust and intake of an internal combustion engine occurs may be accurately controlled.

It is a further object of the invention that the rotary valve construction may be operated from a remote point.

A still further object of the invention is that the valve construction permit increase and decrease of the exhaust opening simultaneously with the increase and decrease of the intake opening of an internal combustion engine.

Other objects will hereinafter appear.

The invention is illustrated by way of example in the accompanying drawings, in which:—

Figure 1 is a side elevation of a four cylinder combustion engine illustrating the present invention applied, Figure 2 is a top plan view of the same with parts broken away and shown in section to more clearly illustrate the invention, Figure 3 is a longitudinal vertical sectional view illustrating the preferred construction of a rotary valve unit of the present invention and also operating means therefor, Figure 4 is a vertical sectional view taken through an engine cylinder with which the present invention is associated, Figure 5 is a perspective view of the rotary valve sleeve of a valve unit, Figure 6 is a diagrammatic view illustrating the manner in which the valve openings of the rotary valve sleeves are positioned.

Referring to the drawings more particularly, A indicates generally an internal combustion engine of the four cycle type; 10 the crank case thereof; 11 the crank shaft; 12 the cylinders and 13 the water jacket for each of said cylinders.

In carrying out the use of the present invention, a casting B is secured to each side of the engine A. Each casting comprises a cylindrical housing 14 which is formed with a longitudinally extending slot 15 and the bolting flanges 16 by which the same may be secured to the cylinder walls by the means of the flange bolts as indicated at 17. The walls of each cylindrical housing are hollow as indicated at 18 and the cavity or passage so formed communicates with the interior of the water packet of each cylinder 12 through a passage indicated at 19, Figure 4. The walls of each cylinder 12 are provided with a pair of opposing nipples 20 and 21, the nipple 20 providing the exhaust passage 20' and the nipple 21 providing the intake passage 21'. Each nipple communicates with the interior of the cylindrical housing 14 through a nipple 22.

Within the cylindrical housing 14 of the casting A there is positioned the rotary valve sleeves 23 and 24; the sleeve 23 encircling the sleeve 24 as shown. The rear end of the sleeves are closed by a cap 26 which is bolted to a flange 27 formed upon the corresponding end of the cylindrical housing 14. The valve sleeve 24 associated with the intake passages 21 of the engine is connected with the pipe 28 through the cap 26, and the pipe 28 in turn is connected with a carburetor 29, while the valve sleeve 24 associated with the exhaust 20' is connected in a similar manner with the exhaust pipe indicated at 30.

Since the remaining details of construction of the rotary valve unit associated with the exhaust side engine is the same as that associated with the intake side of the engine only one construction will be referred to in the following description.

The forward end portion of the sleeve 24 is solid as at 32 and adjacent the end thereof there is formed a spiral groove 33; and at a point immediately at the rear of the spiral groove 33 there is formed an annular groove 34. The forward end of the valve sleeve 23 is formed with an enlargement 35, a portion of which is fitted within an enlargement 36 of the cylindrical housing 14. The forward end of the sleeve 24 projects from the sleeve 23 and the protruding end carries an elongated collar 37, said collar being formed with a spiral rib 38 adapted to move within the spiral groove 33. Also the collar is formed with a head 39, said head being provided with an annular groove 40, the purpose of which will later appear.

The collar 37 and enlarged portion 35 of the sleeve 23 are provided with aligned keyways 41 and 41', respectively Figures 3 and 5, and within these keyways there is secured a key 42, said key being secured by the means of a screw 43 extending through the enlarged portion 35 of the sleeve 23, and also having its end extending into the annular groove 34 of the sleeve 24. The collar 37 by this arrangement is free to move longitudinally of the said end of the sleeve 24. Also a screw 44 is threaded through the enlarged portion 35 of the sleeve 23 and its end projecting into the annular groove 34. Also the enlarged portion 35 of the sleeve 23 is formed with an annular groove as indicated at 46' and into this annular groove there extends the ends of a pair of set screws 46, said set screws being threaded through the walls of the cylindrical housing 14, as shown. Upon the enlarged portion 35 of the valve sleeve 23 there is mounted a spiral gear 47 which is provided with a slot adapted to accommodate the key 42. The spiral gear is held against rotative movement by the means of the key 42, but free to move longitudinally of the sleeve 23. The gear has formed therewith a hub portion 48 in which there is provided an annular groove 49, the purpose of which will later be made apparent.

Upon the forward end of the engine there is secured a bracket 50 which has formed at each of its ends a bearing portion 51 adapted to journal the shaft 52. A miter gear 53 is carried upon each end of the shaft 52, the lowermost of which is adapted to mesh with a similar gear 54 secured upon the gear shaft 11.

Between the spiral gears 47 there is rotatably positioned a spiral gear 55, which is adapted to continuously mesh with the spiral gears 47. Upon the forward end or face of the spiral gear 55 there is formed a miter gear 56, which is adapted to mesh with the miter gear 53 carried upon the upper end of the shaft 52. As is obvious the rotation of the crank shaft 11 will be transmitted to rotate the spiral gears 47. The purpose of using the spiral gears 47 and the intermediate spiral gear 55 is to provide means whereby with the movement of either of the spiral gears 47 longitudinally of the sleeves 23 and 24, the same will be transmitted into a rotary movement of the spiral gears 47 and also the sleeve 23. This operation will be later more fully described.

In each instance, the valve sleeves 23 and 24 are each provided with a plurality of ports 54', said ports being adapted to be brought into alignment with each other by the rotation of the sleeve. The ports 54' are arranged so that they may establish communication between the interior of the valve sleeves 24 and the interior of each of the cylinders of the engine. Also the ports 54' are so arranged so that such communication may be intermittent during the rotation of the valve sleeves 23 and 24 as diagrammatically illustrated in Figure 6. The size of the passages leading from the valve sleeve 24 into the intake passages 21' of the engine cylinders may be regulated by individual rotation of either of the sleeves while the other remains stationary. Also as is apparent by rotating the sleeve 23 and permitting the sleeve 24 to remain stationary the position of the ports 54' with respect to the intake ports 21' of the engine cylinders can be changed and thereby change the time at which these ports would establish communication between the interior of the tube 24 and of the combustion chamber of the engine cylinders.

Upon the casting B there is formed a plurality of supports 59 in the upper ends of which there is slidably mounted a pair of control rods 60 and 61. Upon the forward end of each rod there is carried a shifter fork 62. The shifter fork associated with the rod 60 having its fork portion disposed in the groove 40 of the collar 37, while the same fork associated with the rod 61 has its fork portion disposed in the groove 49 of the spiral gear 47. The rear end of each of the rods are of course provided with means whereby the same may be manually shifted and in case the engine was associated with an automobile this means of course would be in convenient reach of the driver of the automobile. Also interposed in the length of each rod there may be a nut and screw arrangement as generally indicated at 63, Figure 1, whereby the length of the rods may be adjusted.

In the operation of the present device, the sleeves 23 and 24 for both the exhaust unit and the intake unit will be driven at the same speed, and the exhaust and intake ports 54' will be arranged so that communication with the exhaust ports and intake ports 20' and 21', respectively, will be established at the proper intervals. In case it is desired to enlarge the exhaust ports and intake ports 54' of the valve sleeves 23 and 24, it is only necessary to move the rods 60 in the proper direction for rotating the sleeve 24 in an anti-clockwise direction. The ports of each sleeve in this manner can be brought to fully register with each other and to form the greatest possible passage through the sleeve. In case it is desired to decrease the passage by the ports 54' then of course the rods 60 are moved in a direction for rotating the sleeve in the opposite direction.

Should it become desirable to change the time at which the intake and exhaust ports 54' would establish communication with the intake and exhaust ports of the engine cylinders during the rotation of the sleeves 23 and 24 then the rods 61 should be shifted longitudinally in the proper direction, so that the sleeve 23 may be rotated through the spiral gears 47 and intermediate spiral gear 55.

While I have shown and described the preferred form of my invention it is to be understood that I am aware of the fact that the construction, combination and arrangement of parts may be changed by those skilled in the art without departing from the spirit of my invention, as indicated by the appended claims.

I claim:—

1. In combination with an internal combustion engine, a pair of rotary valves, one valve controlling the exhaust ports of said engine and the other controlling the inlet ports, each valve comprising a pair of rotary and telescopic sleeves having openings by which the inlet ports and outlet ports of the engine may be adjustably controlled, means whereby the sleeve of each rotary valve may be individually rotated for increasing or decreasing the area of ports thereof communicating with the outer sleeve, means whereby the inner sleeve of each valve may be driven from the power shaft of the associated engine, and means whereby the driving means may be adjusted to change the relative position of the rotary valve with relation to the intake and outlet ports of the engine.

2. In combination with an internal combustion engine, a pair of rotary valves, one valve controlling the exhaust ports of said engine and the other controlling the inlet ports, each valve comprising a pair of rotary and telescopic sleeves having openings by which the inlet ports and outlet ports of the engine may be adjustably controlled, means whereby the sleeve of each rotary valve may be individually rotated for increasing or decreasing the area of ports thereof communicating with the outer sleeve, and adjustable gear means whereby the innermost sleeve of each rotary valve may be driven from the power shaft of the associated engine, said means being adapted to be adjusted for changing the rotation of the innermost valve sleeve so that the moment when said sleeves establish communication with the inlet and outlet ports of the engine may be regulated.

3. In combination with an internal combustion engine, a pair of rotary valves, one valve controlling the exhaust ports of said engine and the other controlling the inlet ports, each valve comprising a pair of rotary and telescopic sleeves having openings by which the inlet ports and outlet ports of the engine may be adjustably controlled, means whereby the sleeve of each rotary valve may be individually rotated for increasing or decreasing the area of ports thereof communicating with the outer sleeve, a spiral gear carried by each of the innermost sleeves of said rotary valve, a spiral gear interposed between the last named spiral gears and adapted to mesh therewith, and means for rotating the last named spiral gear, said last named spiral gear being adapted to permit a predetermined amount of lateral shifting movement of the first named spiral gears without being disconnected therefrom for the purpose described.

4. In a rotary valve, a pair of telescopic sleeves having openings adapted to be brought into register with the rotation of either of said sleeves, means for rotating the outermost sleeve, and means for independently and adjustably rotating the outermost sleeve in either direction whereby to change the movement when the openings of the outermost sleeve will be brought into register with the openings of the innermost sleeve during the rotation of the outermost sleeve.

5. In combination with an internal combustion engine, a rotary valve comprising a pair of telescopic sleeves having openings adapted to be brought into register with each other upon the rotation of one of said sleeves, and also into register with the exhaust inlet ports of said engine, and means whereby the outermost sleeve will be driven at a predetermined rate, said means being adapted to permit independent rotation of said sleeve in either direction whereby to govern the movement when the openings of said sleeve will be brought into register with the ports of said engine.

AXEL E. OLSON.